United States Patent

[11] 3,622,456

| [72] | Inventors | Hiroshi Onishi;<br>Toshiyuki Suzuki, both of Noda-shi, Japan |
|---|---|---|
| [21] | Appl. No. | 842,346 |
| [22] | Filed | July 16, 1969 |
| [45] | Patented | Nov. 23, 1971 |
| [73] | Assignee | Noda Institute for Scientific Research<br>Noda-shi, Japan |
| [32] | Priority | July 26, 1968 |
| [33] | | Japan |
| [31] | | 43/52482 |

[54] PROCESS FOR PRODUCING MANNITOL BY FERMENTATION
8 Claims, No Drawings

[52] U.S. Cl.................................................. 195/37, 195/49
[51] Int. Cl..................................................... C12c 1/00
[50] Field of Search........................................... 195/32, 37, 38, 49; 127/29

[56] References Cited
OTHER REFERENCES

Onishi et al., " Production of Mannitol and Glycerol by Yeasts," Applied Micro., Vol. 16, pp. 1,847– 1,852, 1968.

Roxburgh et al., " Recovery of Polyhydric Alcohols," Can. J. of Tech., Vol. 34, pp. 248– 253, 1956.

*Primary Examiner*—A. Louis Monacell
*Assistant Examiner*—Gary M. Nath
*Attorney*—Cushman, Darby & Cushman

ABSTRACT: Mannitol is prepared by aerobically cultivating microorganisms belonging to *Torulopsis* in a culture medium containing D-glucose, maltose, glycerol and/or xylitol as a main carbon source and then recovering the mannitol produced. The microorganism is *Torulopsis mannitofaciens* ATCC 20221.

PROCESS FOR PRODUCING MANNITOL BY FERMENTATION

BACKGROUND OF THE INVENTION

1. Field of the Invention

The present invention relates to a production of mannitol by yeast fermentation.

2. Description on the Prior Art

Mannitol is an old compound and useful for base or excipient for tableting, ingredient in electrolytic condensers medicine, basis of dietetic sweets and starting point of many derivatives.

A process for producing mannitol by use of micro-organisms such as Koji mold, has been well known. The production thereof by *Aspergillus mannitosus* and *Aspergillus candidus* has recently been reported [*J. of Agr. Chem. Soc. Japan*, 31, 244, 247 (1957), *Biotechnol. Bioengo.* 9, 365 (1967)]. The production by heterolactic acid bacteria has also been known [*J. of Agr. Chem. Soc. Japan*, 14, 1449(1938)]. As for the mannitol production by yeasts, Osaki reported that a very small amount of mannitol was found in a fermentation liquor of sucrose by a sake yeast, [Osaki Masao: *J. Fermentation Technol.* 16, 597(1937)], and Roxburgh et al. has reported that some osmophilic yeasts produce a trace amount of mannitol accompanying the production of erythritol. [J. M. Roxburgh et al. *Can. J. Technol.* 34, 248(1956)]. However, the yields in these yeast fermentations are as low as about 0.1 percent based on sugar. It is out of the question as a fermentative production. The present inventors have studied various processes for producing mannitol by micro-organisms at low cost without difficulty. As a result, they have found that, for example, a new species, *Torulopsis mannitofaciens* (ATCC 20221) belonging to *Torulopsis* isolated from moromi of soy sauce, exclusively produces mannitol from D-glucose, other sugars and sugar alcohols as a main substrate and accumulates a large amount of it in a fermented broth.

The object of the present invention is to provide a process for commercial production of mannitol from a carbon source such as glucose, glycerol, other sugars and sugar alcohols by yeasts.

BRIEF SUMMARY OF THE INVENTION

Micro-organisms

Yeasts employed in the present invention belong to *Torulopsis*. Representative yeasts are as follows.

| 1. *T. mannitofaciens* | ATCC 20221 |
| 2. *T. versatilis* | ATCC 20223 |
| 3. *T. anomala* | (ATCC 20222) (IFO |

Description of *Torulopsis mannitofaciens*

The deposited organisms ATCC 20221, ATCC 20222 and ATCC 20223 will be made freely available upon the issuance of a patent and the cultures will be maintained in the public depository for the life of the of the patent issuing from this application.

Growth in Koji extract: After 7 days at 25° C., cells are short oval to spherical, 2.3 4.6 μusually in small clusters. A thin ring and sediments form gradually but a pellicle is not formed.

Streak culture on Koji agar: After 3 weeks at 25° C., cream to grey-colored, surface smooth and glistening, soft-texture, cross section low convex and border entire.

Neither true mycelium nor pseudomycelium is formed.

Ascospore formation has not been observed.

Fermentation:
| | |
|---|---|
| glucose | + |
| galactose | + |
| sucrose | + |
| maltose | + |
| lactose | + (very weak and slow) |
| raffinose | − |
| melibiose | − |
| trehalose | + |

Assimilation of carbon compounds:
| | | | |
|---|---|---|---|
| glucose | + | ethanol | − |
| galactose | + | glycerol | + |
| sucrose | + | erythritol | − |
| maltose | + | adonitol | − |
| lactose | + | xylitol | + |
| L-sorbose | − | D-arabitol | − |
| cellobiose | + | L-arabitol | + |
| trehalose | + | dulcitol | − |
| melibiose | + | D-mannitol | + |
| raffinose | + | D-sorbitol | − |
| melezitose | − | α-methyl-D-glycoside | − |
| soluble starch | − | salicin | − |
| inulin | − | inositol | − |
| D-xylose | + | lactic acid | − |
| L-arabinose | + | succinic acid | + |
| D-arabinose | − | citric acid | − |
| D-ribose | + | pyruvic acid | − |
| L-rhamnose | − | | |
| D-glucosamine | − | | |

Assimilation of potassium nitrate +, urea +, sodium nitrite −, ethylamine hydrochloride −, creatine −, and creatinine −.

Splitting of arbutin: Negative.

Growth on 50 percent (W/W) glucose-yeast extract agar: Good growth.

Sodium chloride tolerance: 18 percent

Growth in vitamin-free medium: Negative.

Production of acid on Custer's medium: Positive.

Maximum temperature for growth: 35° C.

From the above-stated properties, the present strain belongs to genus *Torulopsis*. The fermentative property of sugar thereof is similar to *Torulopsis versatilis*. However, the present strain can be easily distinguished from *Torulopsis versatilis* by the assimilation reaction of D-xylose, L-arabinose, xylitol and L-arabitol and moreover, other properties are not identical to any strains belonging to *Torulopsis* already known. Therefore, the present strain is regarded as a new species and named *Torulopsis mannitofaciens*.

2. *Torulopsis versatilis*

Farlowia 4, 871950

"The Yeasts," a taxonomic study edited by J. Lodder and N. J. W. Kreger-van Rij, p. 427 (1952)

3. *Torulopsis anomala*

Farlowia 4, 87 (1950),

"The Yeasts," a taxonomic study by J. Lodder and Kreger-van Rij, p. 431 (1952)

Culture Medium

Any culture media which are adequate for the growth of yeasts may be used. For example, liquid media such as Wickerham's medium are usable.

C-source

D-glucose is used as a main starting material. The concentration thereof is in a wide range, preferably, 10–30 percent. Maltose, D-fructose, D-mannose or D-galactose may be used instead of D-glucose. Moreover, sugar alcohols such as glycerol or xylitol can be also used. Mixtures of these sugars and sugar alcohols may be employed.

N-source and Others

Various kinds of N-sources are available. For example, any substances of organic origin (casein hydrolyzate, peptone, amino acid, urea and the like) and inorganic origin (ammonium sulfate, ammonium chloride and the like) can be used as nitrogenous compounds. Phosphates, magnesium salts, calcium salts and the like are used as inorganic substances. Moreover, yeast extract, vitamins and the like suitably selected are used according to the conventional method.

Culturing

Said strain is inoculated into thus-prepared culture medium and cultured at 25°–30° C. under aerobic conditions, i.e., while suitably aerating or supplying air by a shaking method. The fermentation is completed in 6–10 days. A seed micro-organism precultured in an appropriate medium such as a fermentation medium may be inoculated into the above-mentioned culture medium.

Recovery

A clarified broth obtained by filtering cell bodies and then treating with $ZnSO_4$ for removing proteinaceous materials from said fermented liquor is concentrated to dryness in vacuum at a temperature of 50° C. or less. The dried material is extracted with hot ethanol. The extract, thus obtained, is allowed to stand in a cold place so as to obtain crystals of mannitol. The crystals are recrystallized three times with 95 percent alcohol. The pure crystal has a melting point of 165° C. and a slightly sweet taste. The molecular formula thereof is $C_6H_{14}O$ and $[\alpha] = +24.2$ (C, 7.81 saturated borax solution) is shown. The infrared absorption spectrum is indistinguishable from that of authentic mannitol. The crystalline product obtained is identified as mannitol. In case of culturing *Torulopsis mannitofaciens* in a culture medium containing sugars such as glucose and the like, the residual extract, from which mannitol has been removed, contains glycerol simultaneously produced and accumulated.

Yield:

*Torulopsis mannitofaciens* gives mannitol in good yield of as high as 30 percent based on the sugar consumed.

Preferred Embodiment

Example 1

| | |
|---|---|
| D-glucose | 20.0% |
| Casamino acids (Difco) | 0.4% |
| $KH_2PO_4$ | 0.4% |
| $MgSO_4 \cdot 7H_2O$ | 0.05% |
| $CaCl_2 \cdot 2H_2O$ | 0.01% |
| NaCl | 0.01% |
| Yeast extract (Difco) | 0.1% |

Fifty ml. of a culture medium prepared by mixing the compounds mentioned above in the above-mentioned ratio was put into a shaking flask. Thereto 1 ml. of the freshly precultured liquor of *Torulopsis mannitofaciens* was inoculated and cultured with shaking for 10 days at a temperature of 25°–30° C. The filtrate of the fermentated broth was concentrated in vacuum so as to remove moisture almost completely.

The dried material was extracted with hot ethanol. After standing in cool, pure crystal was formed from the extract and the crystal was purified by repeating recrystallization from 95 percent ethanol. Namely, 2.7 g. of mannitol was obtained from 9.7 g. of glucose and the yield based on sugar was 28 percent. 2.8 g. of glycerol was contained in the residual extract after recovered mannitol, and glycerol yield based on sugar was 29 percent.

Example 2

*Torulopsis mannitofaciens* was inoculated into a culture medium prepared by adding 10 percent maltose instead of D-glucose in the same culture medium as in example 1 and cultured in the same manner as in example 1. 1.37 g. of mannitol (the yield based on sugar is 34.3 percent) and 0.5 g. of glycerol (the yield based on sugar is 12.5 percent) were obtained from 4.0 g. of maltose.

Example 3

| | |
|---|---|
| Glycerol | 10.0% |
| Corn steep liquor | 0.8% |
| $KH_2PO_4$ | 0.1% |
| $MgSO_4 \cdot 7H_2O$ | 0.5% |
| $CaCl_2 \cdot 2H_2O$ | 0.01% |
| NaCl | 0.01% |
| Yeast extract (Difco) | 0.05% |
| pH | 5.5 |

Fifty ml. of a culture medium prepared by mixing the above-mentioned compounds in the above-mentioned ratio was put into a shaking flask. Thereinto 1 ml. of the precultured liquor of *Torulopsis mannitofaciens* in the same medium as mentioned above was inoculated, and cultured with shaking for 6 days at 25°–30° C. Fermentation was thus completed. The filtrate of the fermented broth was concentrated in vacuum to dryness. The dried material was extracted with hot ethanol. The extract gave the crystal, and the crystal was purified by repeating recrystallization from 95 percent ethanol. Namely, 1.05 g. of mannitol was obtained from 3.85 g. of glycerol. The yield based on glycerol consumed corresponds to 27 percent.

In case of culturing *Torulopsis anomala* in the same manner as described above, the yield of mannitol was 11 percent based on glycerol.

Example 4

| | |
|---|---|
| D-glucose | 10% |
| Casamino acids (Difco) | 0.4% |
| $KH_2PO_4$ | 0.1% |
| $MgSO_4 \cdot 7H_2O$ | 0.05% |
| $CaCl_2 \cdot 2H_2O$ | 0.01% |
| NaCl | 0.01% |
| Yeast extract (Difco) | 0.1% |

Fifty ml. of the above-mentioned medium was put into a shaking flask and thereinto 1 ml. of a precultured liquor of *Torulopsis versatilis* was inoculated and cultured with shaking for 10 days at a temperature of 25°–30° C. Fermentation was thus completed.

The filtrate of the fermented broth was concentrated in vacuum to dryness. The dried material was extracted with hot ethanol. The extract gave the crystal. The crystal was purified by repeating recrystallization from 95 percent ethanol. 1.48 g. of mannitol was produced from 9.88 g. of glucose consumed. (the yield based on sugar was 15 percent).

Example 5

*Torulopsis anomala* was cultured in the same medium as in example 4. 1.06 g. of mannitol was obtained from 7.25 g. of glucose consumed. The yield based on glucose consumed was 14.6 percent.

Example 6

| | |
|---|---|
| Xylitol | 10.0% |
| Corn steep liquor | 0.8% |
| $KH_2PO_4$ | 0.1% |
| $MgSO_4 \cdot 7H_2O$ | 0.05% |
| $CaCl_2 \cdot 2H_2O$ | 0.01% |
| NaCl | 0.01% |
| Yeast extract (Difco) | 0.05% |
| pH | 5.5 |

Fifty ml. of the above-mentioned culture medium was put into a shaking flask and thereinto 1 ml. of the precultured liquor of *Torulopsis mannitofaciens* in the same medium was inoculated and cultured with shaking for 6 days at 25°–30° C. Fermentation was thus completed. The filtrate was concentrated in vacuum to dryness. The dried material was extracted with hot ethanol. The extract gave crystals, and the crystal was purified by repeating recrystallization from 95 percent ethanol. 1.81 g. of mannitol was obtained from 9.05 g. of xylitol used. The yield was 20.0 percent.

What is claimed is:

1. A process for producing mannitol by fermentation which comprises inoculating yeasts which belong to genus *Torulopsis* and are capable of producing mannitol from sugars and/or sugar alcohols in a culture medium containing D-glucose, maltose, glycerol or xylitol as the principal substrate, culturing under aerobic conditions so as to produce and accumulate mannitol in the culture medium and then, recovering the mannitol.

2. A process according to claim 1 wherein the yeast employed in *Torulopsis mannitofaciens* ATCC 20221, *Torulopsis versatilis* ATCC 20223 or *Torulopsis anomala* ATCC 20222.

3. A process of claim 1 wherein the micro-organism employed is *Torulopsis mannitofaciens* ATCC 20221.

4. A process of claim 1 wherein the micro-organism is *Torulopsis versatilis* ATCC 20223.

5. A process of claim 1 wherein the micro-organism is *Torulopsis anomala* ATCC 20222.

6. A process of claim 1 wherein culturing is conducted at 25°–30 C. for 6 to 10 days.

7. A process of claim 1 wherein the substrate concentration of the sugars and/or the sugar alcohols in the culture medium is 10–30 percent by weight.

8. A process according to claim 1 wherein the *Torulopsis* is capable of forming at least 14.6 percent of mannitol from the sugar or sugar alcohol and the process is continued until the amount of mannitol produced is at least 14.6 percent based on the sugar or sugar alcohol consumed.

* * * * *

UNITED STATES PATENT OFFICE
CERTIFICATE OF CORRECTION

Patent No. 3,622,456　　　　　　　　　Dated November 23, 1971

Inventor(s) Hiroshi Onishi and Toshiyuki Suzuki

It is certified that error appears in the above-identified patent and that said Letters Patent are hereby corrected as shown below:

Cover Sheet:

Item 31, add --39556/69--;

Item 32, add --May 23, 1969--;

Item 33, add --Japan--.

Signed and sealed this 30th day of May 1972.

(SEAL)
Attest:

EDWARD M. FLETCHER, JR.　　　　　　ROBERT GOTTSCHALK
Attesting Officer　　　　　　　　　　Commissioner of Patents